Figure 1:
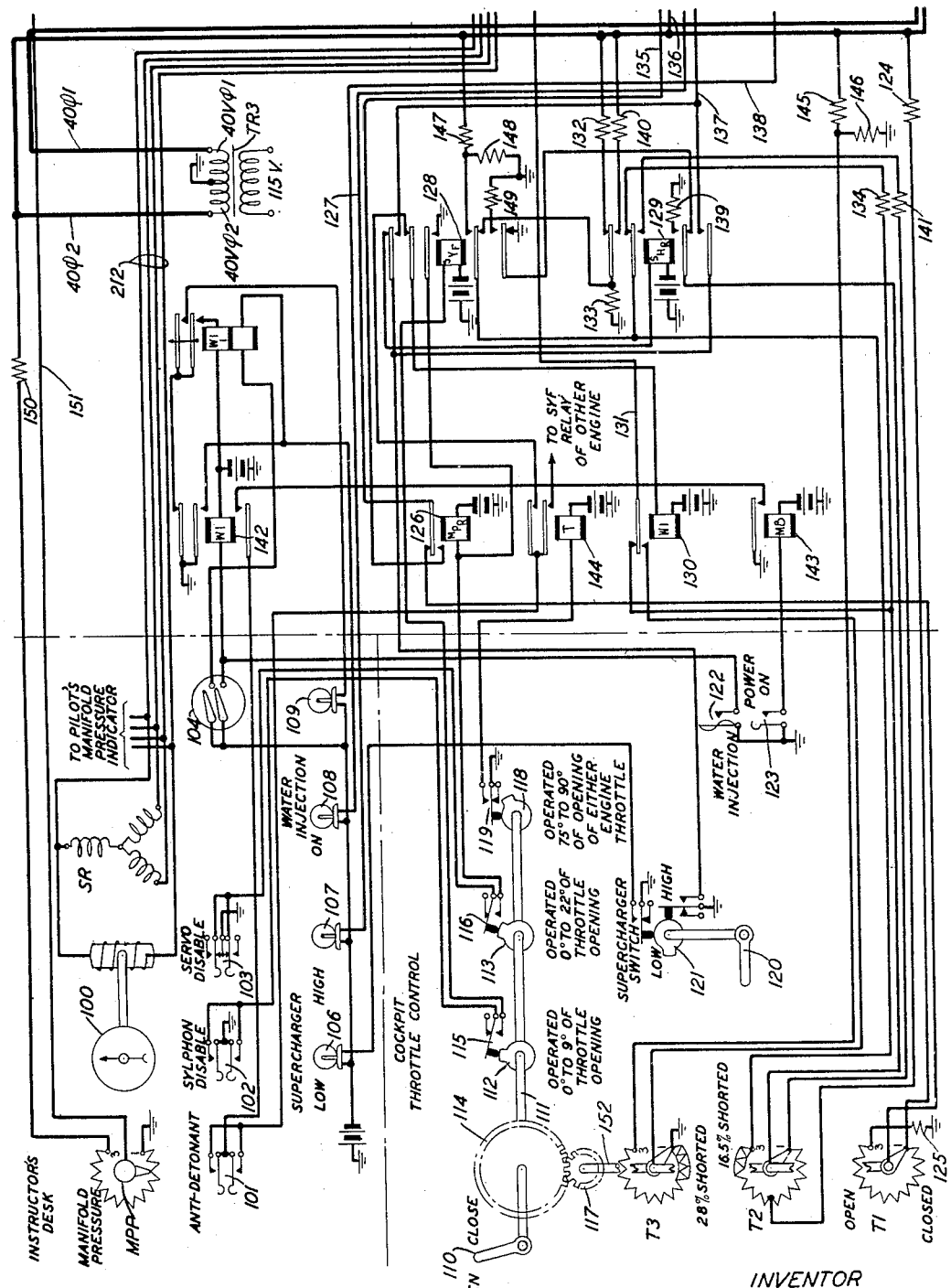

INVENTOR
J. J. LUKACS
BY
P. C. Smith
ATTORNEY

Patented Mar. 7, 1950

2,499,597

UNITED STATES PATENT OFFICE 2,499,597

ENGINE MANIFOLD PRESSURE SIMULATING APPARATUS FOR AIRCRAFT GROUND TRAINERS

Joseph J. Lukacs, New Rochelle, N. Y., assignor to Bell Telephone Laboratories, Incorporated, New York, N. Y., a corporation of New York Application July 31, 1946, Serial No. 687,471

14 Claims. (Cl. 35—12)

This invention relates to an aviation trainer and more particularly to circuits and apparatus which simulate the functioning of the manifold pressure regulator used in conjunction with water injection whereby when the cockpit throttle control is set by the pilot for a desired manifold pressure, such pressure is automatically maintained up to the critical altitude. The circuits also simulate the ram effect on the manifold pressure due to high air speeds.

In airplanes of certain types a manifold pressure regulator is provided for automatically maintaining a desired manifold pressure. The regulator is provided on one side of its casing with a lever which is connected by a suitable linkage with the pilot's throttle control quadrant, and with a lever on the opposite side of the casing which is connected by suitable linkage with the carburetor throttle lever. The pilot's throttle control quadrant is movable through an angle of 90 degrees whereas by mechanical linkage the throttle lever is movable through an arc of approximately 29 degrees. Three pipes enter the regulator the first of which connects the intake manifold of the engine with a Sylphon bellows in the regulator whereby the Sylphon bellows takes an adjustment which varies with the manifold pressure. The second pipe is connected with the supercharger blower speed control valve so that the change in oil pressure in such pipe when the valve is operated to shift the blower gears to drive the blower at a high or at a low speed, the regulator is reset in accordance with such shift. The third pipe is connected to the antidetonant water injection regulator whereby the manifold pressure regulator is reset by water pressure applied through the pipe when anti-detonant injection operation of the engine is being had. The manifold pressure regulator is also provided with a hydraulically operated servo system which is responsive to the manifold, oil and water pressures applied through the three pipes to effect a variable coupling between the two levers before mentioned.

The operation of the manifold pressure regulator is accomplished by the actuation of the pilot's control lever of the regulator in response to the operation of the throttle quadrant until the desired manifold pressure is obtained. The regulator will then maintain this manifold pressure within the limits of its design and the limits of engine performance regardless of engine R. P. M., altitude or air speed.

The pilot's control lever is interconnected within the regulator to the carburetor throttle actuating lever in such a manner that the carburetor throttle is mechanically operated by movement of the pilot's control lever for the first 22 degrees of throttle quadrant movement. This, accordingly, opens the carburetor throttle approximately 8 degrees. In general, this throttle opening or minimum throttle angle provides for manual control of the engine for starting, idling and taxiing.

As the rotation of the pilot's throttle control lever is increased the selected manifold pressure will be somewhat higher than that which would normally be obtained by manual operation of the carburetor throttle and consequently the hydraulic servo system within the regulator must open the throttle further to automatically obtain and regulate the selected manifold pressure. Therefore, while full travel of the pilot's control lever will mechanically provide a maximum of 29 degrees of throttle lever travel, the hydraulic servo system will automatically open the throttle so that the selected manifold pressure is secured.

It should be noted that at 53.5 degrees rotation of the pilot's control lever Normal rated power manifold pressures are obtained in both high and low blower ratios and at 75 degrees rotation Military power manifold pressures in both high and low blower ratios are realized. Separate schedules of manifold pressure selection versus pilot control lever position are used for low blower ratio, high blower ratio and anti-detonant injection operation. When the mode of engine operation is changed by the pilot's use of any of these types of operation, the manifold pressure regulator automatically shifts from one manifold pressure regulator schedule to another. However, the manifold pressure regulator does not actuate the shift from low to high blower ratio or the reverse nor does it cause the anti-detonant injection system to function. Normal controls are still required to operate the supercharger speed selector valve and the anti-detonant injection equipment.

When making a Military or Normal rated power climb the pilot can shift from low blower to high blower ratio and the manifold pressure regulator will automatically maintain the manifold pressure at the required value without requiring a change in the position of the throttle control. The change of the manifold pressure schedule following the supercharger blower clutch shift is accomplished within the regulator itself by the introduction of high ratio clutch oil pressure through the second pipe above referred to. Conversely, when the blower ratio is shifted from high to low, the loss of high ratio clutch oil pressure resets the manifold pressure to the low blower ratio schedule.

The anti-detonant injection manifold pressure schedule is accomplished in a similar manner by pressure applied to the third pipe above referred to when the anti-detonant injection system is operated. The maximum manifold pressure which can be obtained under the anti-detonant injection operating condition is adjustable to suit the varying speeds as dictated by individual types of installation. If the anti-detonant system is turned on in the manifold pressure range where the anti-detonant injection manifold pressure is higher than the operational (low or high blower ratio) manifold pressure, the regulator will immediately open the carburetor throttle to provide the selected anti-detonant system manifold pressure provided that this can be obtained within the range of full throttle operation. When the anti-detonant system is turned off or if the anti-detonant liquid supply is exhausted, the anti-detonant pressure of course immediately fails and the manifold pressure is reset by the regulator to the low or high blower ratio dictated by the pilot's throttle lever position.

Should the oil supply to the manifold pressure regulator fail, the piston of the servo-system is immediately forced to its full decreased position by the action of a spring and manual control of the carburetor throttle is then obtained. The relative motion of the pilot's control lever to that of the carburetor throttle lever is thereby rendered identical to that which is obtained when the engine is shut down. In other words, full 90 degrees travel of the pilot's control lever will result in approximately 29 degrees travel of the carburetor throttle lever. This is sufficient to give a throttle opening at sea level corresponding to 47 inches of mercury of manifold pressure in high blower and 41 inches of mercury of manifold pressure in low blower at 2800 revolutions per minute.

The manifold pressure sensitive bellows of the regulator consist of the manifold pressure vented bellows connected as previously stated through the first pipe to the engine intake manifold balanced against an evacuated bellows. In the event of failure of the evacuated bellows, the manifold pressure selection schedules are increased by the amount of absolute drain oil pressure existing in the regulator. However, in order to permit operation at low power, a feature known as "low boost lock-out" operates through the first nine degrees of the pilot's throttle control lever travel. The power obtained in this range is identical to the manual schedule available for idling and taxiing as described for normal operation.

In an airplane it is customary to position the intake air scoop for the carburetor so that the maximum amount of air is supplied and therefore the scoop is directed forwardly. The result is that as the air speed increases, a ram effect is produced which increases the pressure of the air directed to the carburetor and thus increases the effective manifold pressure of the engine. This ram effect is proportional to the indicated air speed. For example, as the air speed increases to 200 knots the ram effect will produce an increase in the manifold pressure of about two inches of mercury and if the air speed increases to 400 knots the ram effect will produce an increase in the manifold pressure of about six inches of mercury. It is thus apparent that the ram effect is very advantageous in increasing the power of the airplane and thus increasing the ceiling of its flight.

It is an object of the invention to enable the simulation of the operation of a manifold pressure regulator to regulate the manifold pressure of an airplane engine in accordance with the setting of the engine throttle for a desired value of manifold pressure.

A further object of the invention is to enable the simulation of the increase in manifold pressure due to the ram effect.

The first of these objects is attained by the provision of a first or manifold pressure regulator motor unit the shaft of which may be moved to positions representative of the desired manifold pressures for the several angles of throttle opening in accordance with the operating schedules for the particular airplane engine which is being simulated whereby a second or manifold pressure motor unit is controlled to cause a manifold pressure indicator to indicate the required manifold pressure. The manifold pressure regulator motor unit is responsive to throttle control, to anti-detonant or water injection control, and to supercharger blower speed control in simulation of the response of the regulator of an actual airplane to such controls.

The second of the stated objects is attained by the provision of a potentiometer the slider of which is advanced as the indicated air speed increases to apply an increasing value of signal potential to the manifold pressure motor unit of a phase which will cause such unit to operate in a manner representative of an increase in manifold pressure as the indicated air speed increases.

Figure 2:
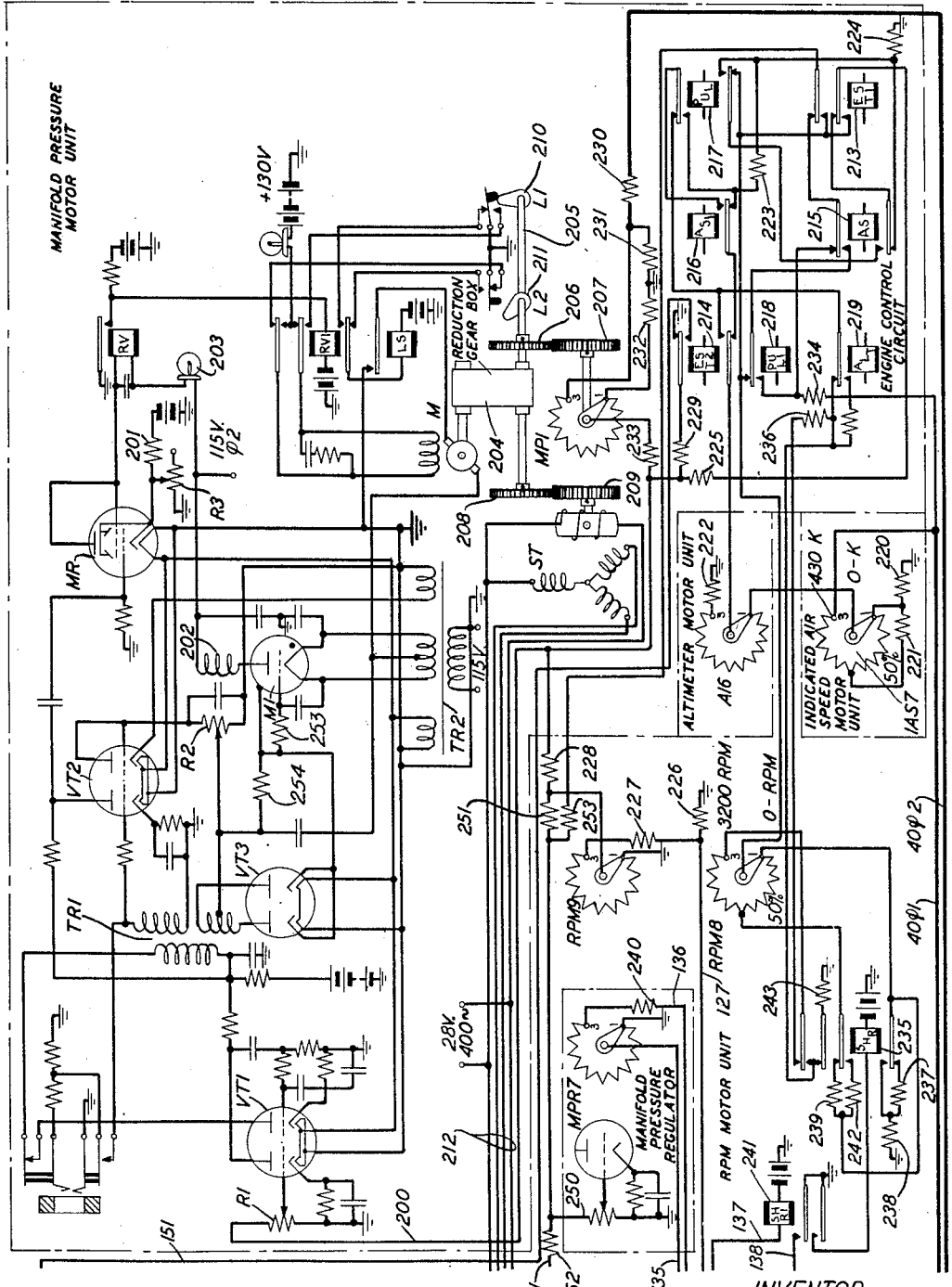

Other features of the invention will become apparent upon the consideration of the following detailed description of the invention when read in connection with the accompanying drawings in which:

Fig. 1 shows in the upper left portion thereof instruments, controls and lamp signals at an instructor's desk; in the lower left portion thereof controls in the cockpit of the trainer and in the right portion thereof relays controllable by the controls at the instructor's desk and in the cockpit for controlling the apparatus of Fig. 2; and Fig. 2 shows portions of the manifold pressure motor unit for simulating the development of manifold pressure in the intake manifold of an airplane engine, the schematic representation of the manifold pressure regulator, R. P. M., altimeter and indicated air speed motor units of the trainer, and portions of the engine control circuit.

For a complete disclosure of the invention Fig. 2 should be placed to the right of Fig. 1.

The motor units disclosed in Fig. 2 are each of the type disclosed in the application of Albert-Davis-Gumley-Holden, Serial No. 502,484, filed September 15, 1943, which issued as Patent No. 2,428,767 on October 14, 1947. To simplify the drawings, the control circuit of only one of these motor units, the manifold pressure motor unit, has been disclosed in detail, the other motor units being shown skeletonized to merely show such potentiometers thereof as are deemed necessary for an understanding of the invention.

The manifold pressure motor unit comprises a first dual vacuum tube VT1 which serves as a two-stage resistance coupled amplifier to amplify the control signal applied over control conductor 200 through the gain control rheostat R1, and to apply the amplified signal potential to the primary winding of the step-up input transformer TRI. The amplified signal is impressed from the lower secondary winding of the transformer through the dual diode tube VT3, serving as a full wave rectifier, upon the control grid of the motor impulsing "thyratron" tube MI and the signal is also impressed from the upper secondary winding of transformer TRI upon the control grid of the left unit of the dual tube VT2 which further amplifies the signal and impresses it upon the control grid of the motor reversing tube MR. Grid bias is supplied to the control grid of the "thyratron" tube MI from the right secondary winding of the filament supply transformer TR2, through the right unit of tube VT2, serving as a rectifier, and such bias is adjusted by the grid bias adjusting rheostat R2. Cathode bias is applied to the cathode of the tube MR from the potential divider comprising the bias adjusting rheostat R3, the resistor 201 and battery.

Tube MI upon firing causes the transmission of positive impulses of current through the rotor circuit of the motor M from the 115-volt phase φ2 source of alternating current. Tube MR upon firing causes the operation of the anode relay RV which in turn causes the operation of the stator circuit reversing relay RV1. The stator winding of the motor M is energized in a circuit over the contacts of relay RV1 from the source of +130-volt direct current.

Cathode heater current is supplied to the filaments of tubes VT1, VT2, VT3 and MR, from the left secondary winding of the filament supply transformer TR2 and heater current is supplied to the filament of tube MI from the middle secondary winding of transformer TR2. Anode potential is applied to the anodes of tube VT1 from the source of +130-volt direct current. Anode potential is supplied from the source of 115-volt phase φ2 potential through choke coil 202 to the anode of tube MI and through the ballast lamp 203 and through the winding of relay RV to the anode of tube MR.

The tube MI is normally negatively biased to a point just below the critical breakdown potential of the tube over a biasing circuit which extends from the grid of the tube through resistors 253 and 254 through the bias control rheostat R2, through the right rectifying unit of tube VT2 and the right secondary winding of filament supply transformer TR2 to ground. When signaling potential is applied to control conductor 200, is amplified by tube VT1 and the amplified potential is impressed upon the lower secondary winding of input transformer TRI, such amplified potential is rectified by the tube VT3 and applied to the grid of tube MI and the negative biasing potential on the grid is thus made less negative so that the tube fires on each positive half cycle of the anode potential applied to its anode. Each time that tube MI fires, an impulse is transmitted through the armature circuit of motor M over a path which may be traced from the 115-volt φ2 source of anode potential through choke coil 202, over the anode-cathode path through tube MI, over the mid-tap connection of the middle secondary winding of transformer TR2, through the armature circuit of the motor M, the back contact of the LS relay and to ground.

The motor M, through the reduction gear box 204, drives the shaft 205 in one or the other direction at a slow speed dependent upon the operated or unoperated condition of relay RV1 and, through pairs of gears such as 206 and 207, drives the sliders of potentiometers such as MP1 and through gears 208 and 209 drives the rotor of the synchro-transmitter ST. Only that one of the potentiometers driven from the shaft 205 which enters into the control of circuits relating to the present invention has been disclosed. The shaft 205 also has secured thereto cams 210 and 211 which control the L1 and L2 limit switches to cause the rotation of the motor M to cease when the sliders of the potentiometers approach the Nos. 1 or 3 terminals of the potentiometer windings, respectively.

The rotor winding of the synchro-transmitter ST is energized from the 28-volt, 400-cycle source of alternating current and the stator windings of synchro-transmitter ST together with the supply conductors from the 400-cycle source are connected over conductors of cable 212 with the corresponding winding terminals of the stator and rotor windings of the synchro-receiver SR at the instructor's desk. The rotor of the synchro-receiver is coupled to the manifold pressure indicator 100, the needle of which is thereby rotated to a position corresponding to the movements of the rotor of synchro-transmitter ST and of shaft 205.

The engine control circuit for simulating the control of the operation of an engine of an airplane has been schematically disclosed in the lower right portion of Fig. 2. This control circuit is of the general character fully disclosed in the application of J. J. Lukacs and W. B. Strickler, Serial No. 542,846, filed June 30, 1944, in the application of F. M. Burelbach and J. J. Lukacs, Serial No. 679,069, filed June 25, 1946, and in the application of C. E. Germanton, Serial No. 622,070, filed October 12, 1945. Only a few of the relays of the control circuit have been disclosed, the EST1 and EST2 relays 213 and 214 which are both energized when the starting of the engine has been simulated, the AS and AS1 relays 215 and 216 which are both operated as soon as simulated air speed has been attained, the PUL and PUL1 relays 217 and 218 which are both operated when the feathered condition of the blades of the engine-driven propeller has been simulated, and the ALT relay 219 which becomes operated when the pilot has set the carburetor air control into the alternate air position.

At the instructor's desk of Fig. 1, a manifold pressure control potentiometer MPP whereby the instructor may introduce a desired manifold pressure control for training purposes, a key 101 for controlling the application of the anti-detonant or water injection operation, a key 102 for simulating the disabling of the Sylphon bellows of the manifold pressure regulator, a key 103 for simulating the disabling of the servo system of the regulator, circuit breaker throw-out switches 104, and lamps 106 to 109, inclusive, for indicating the operated positions of controls in the cockpit of the trainer operable by the pilot are provided.

In the cockpit of the trainer, Fig. 1, the throttle lever 110 is provided. This lever is secured to a shaft 111 to which the cams 112 and 113 and the gear 114 are secured. The cams are effective to operate the contact sets 115 and 116 associated therewith, the contact set 115 being held in the position shown until the throttle lever 110 has been moved through 9 degrees of its operating movement, and the contact set 116 being held in the position shown until the throttle lever has been moved through 22 degrees of its operating movement. The gear 114 through the pinion 117 drives the shaft 152 to which the sliders of the throttle potentiometers T1, T2 and T3 are secured. The cam 118 is operable from the shaft 111, and operates the associated contact set 119 to its alternate position during the final 15-degree movement of the throttle lever, or between the 75-degree and 90-degree throttle positions. If a two-engined airplane is being simulated, a cam similar to cam 118 would be operated from a similar throttle operated shaft to control a contact set similar to 119 connected in parallel with contact set 119 or the cam 118 could be arranged to be operated from either throttle operated shaft. A supercharger control lever 120 is also provided, which when operated rotates the cam 121 to close the "low" blower speed switch when rotated 90 degrees from normal, and to close the "high" blower speed switch when rotated 180 degrees from normal. A water injection control switch 122 of the circuit breaker type and a battery power "on" switch 123 are also provided in the cockpit.

Until the starting of the engine is simulated, the EST1, EST2, AS and AS1 relays 213, 214, 215 and 216 remain unoperated. With no air speed yet developed, the slider of the indicated air speed potentiometer IAS7 will be at the No. 1 terminal of its winding and the slider of the altimeter potentiometer A16 will be at the No. 1 terminal of its winding. The winding of potentiometer IAS7 is energized in a circuit extending from ground through the right half of the secondary winding of transformer TR3, over the 40φ1 bus bar, through the potentiometer winding and through resistor 220 to ground. The first half of the potentiometer winding is shunted by resistor 221 so that when air speed is attained, the potential derived at the slider of such potentiometer will increase at one rate until an airspeed of about 215 knots is reached and will increase at a faster rate until the upper speed 430 knots is reached.

The potential derived from the slider of potentiometer IAS7 is applied through the winding of the altimeter potentiometer A16 and through resistor 222 to ground whereby potential of phase φ1 is derived at the slider of the latter potentiometer and applied over the lower back contact of the EST2 relay 214, over the lower back contact of the AS1 relay 216 and to ground through the potential divider comprising resistors 223 and 224. The potential thus produced at the junction point between resistors 223 and 224 is then applied over the lower back contact of the AS relay 215, over the upper inner back contact of the EST1 relay 213 and through the summing resistor 225 to the signal input conductor 200 of the manifold pressure motor unit.

At this time, since the engine is not running, the shaft of the R. P. M. motor unit will not have been moved from its normal position, representative of no engine speed, and therefore the slider of the R. P. M. potentiometer RPM9 will be at the No. 1 or grounded terminal of its winding and ground potential will therefore be applied from such slider through the summing resistor 228 to signal input conductor 200 of the manifold pressure motor unit. This ground potential will also be applied through summing resistor 251 to the signal input conductor 250 of the manifold pressure regulator motor unit. Ground potential will also be applied from the upper back contact of the EST2 relay 214 of the engine control circuit, through summing resistor 229 to signal input conductor 200, since it is assumed that the starting of the engine has not yet been simulated.

The potential of phase φ1 applied to conductor 200 as previously described is amplified by tube VT1 and the amplified signal potential is then effective to cause the motor-impulsing tube MI to fire and transmit impulses of current through the rotor circuit of motor M, but the phase of the portion of the signal potential which becomes impressed through tube VT2 upon the control grid of the motor-reversing tube MR will be opposite to the phase of the anode potential applied from the source of 115 volt phase φ2 potential and consequently tube MR will not fire and relays RV and RV1 will remain unoperated. With relay RV1 unoperated, the stator winding of the motor M will be energized in such a manner that upon the energization of the rotor circuit by the firing of tube MI, the motor M, through the reduction gear box 204, will turn the shaft 205 in a direction representative of an increase in manifold pressure.

As the shaft 205 rotates, the slider of the balancing potentiometer MP1 is rotated towards the No. 3 terminal of the potentiometer winding. The winding of this potentiometer is energized over a circuit extending from the junction point between the resistors of the potential divider extending from the 40φ2 bus bar through resistors 230 and 231 to ground, thence through the winding of potentiometer and through resistor 232 to ground. An increasing value of phase φ2 potential is thus derived from the slider of this potentiometer as it moves towards the No. 3 terminal of the winding and this potential is applied through summing resistor 233 to signal input conductor 200. When the value of the phase φ2 potential thus applied to conductor 200 balances the phase φ1 signal potential, the tube VT1 will cease to transmit a signal potential to the control grid of tube MI and such tube will cease transmitting driving impulses through the rotor circuit of motor M and the motor will come to rest with the shaft 205 rotated into a position representative of the barometric pressure at sea level.

This position of shaft 205 is communicated to the rotor of synchro-transmitter ST which in the well-known manner will cause the rotor of the synchro-receiver SR to assume a corresponding position to move the needle of the manifold pressure indicator 100 at the instructor's desk into a position to indicate the sea level barometric pressure of 30 inches of mercury.

With the throttle closed at this time and therefore the slider of throttle potentiometer T2 at the No. 1 terminal of its winding, ground potential will be applied from the lower back contact of the SYF relay 128, over the lower back contact of the SHR relay 129 to the No. 1 terminal of the throttle potentiometer T2, thence over the slider of such potentiometer, over the back contact of the WI relay 130, over conductor 131 and through the summing resistor 252 to the signal input conductor 250 of the manifold pressure regulator motor unit. As previously described ground potential is at this time applied to conductor 250 through summing resistor 251. However, signal potential of phase φ1 is at this time applied to conductor 250 from the 40φ1 bus bar, through resistor 234, over the upper back contact of the AS relay 215, over the upper back contact of the EST1 relay 213 and through summing resistor 253 to conductor 250. Thus in response to this phase φ1 potential, the manifold pressure regulator motor unit rotates its shaft to the full extent of its movement or until stopped by the operation of the L2 limit switch of such unit. This motor unit, is, however, without function at this time.

It will now be assumed that the starting of the engine is simulated by the pilot and as a result the EST1 and EST2 relays 213 and 214 both operate and the sliders of the RPM8 and RPM9 potentiometers move away from the No. 1 terminals of the potentiometer windings to positions representative of the idling of the engine at an assumed speed of about 500 R. P. M. The phase $\varphi 1$ potential previously applied to signal input conductor 200 of the manifold pressure motor unit from the junction point between resistors 223 and 224 of the potential divider circuit previously traced from the slider of the altimeter potentiometer A16, over the lower back contact of the EST2 relay 214 and the lower back contact of the AS1 relay 216 through resistors 223 and 224 to ground, is now applied from the slider of potentiometer A16 over the lower front contact of relay 214, over the back contact of the ALT relay 219, it being assumed that the pilot has selected the direct air supply for the carburetor and relay 219 is not therefore operated, and thence by two parallel paths to ground. One of these paths extends over the middle upper back contact of the SHR relay 235 through resistor 243 to ground and the other of the paths extends through resistor 236, over the upper back contact of relay 235, through the winding of the R. P. M. potentiometer RPM8, over the lower back contact of relay 235 and through resistors 237 and 238 to ground. At this time the lower half of the winding of potentiometer RPM8 is shunted over the inner upper back contact of relay 235 and through resistor 239 whereby as the slider of the potentiometer moves from the No. 1 terminal to the mid-tap terminal of its winding, the potential derived at the slider will increase at one rate until an engine speed of approximately 1600 R. P. M. is attained and will then increase at a faster rate until the upper limit of the engine speed of 3200 R. P. M. is attained.

The phase $\varphi 1$ potential derived at the slider of potentiometer RPM8 is then applied over the inner front contact of the EST1 relay 213 and through the summing resistor 225 to signal input conductor 200 of the manifold pressure motor unit. This potential will be less than the potential of phase $\varphi 1$ previously applied to conductor 200 so that now the phase $\varphi 2$ potential applied to conductor 200 from the slider of the manifold pressure balancing potentiometer MP1 through summing resistor 233 will overbalance the phase $\varphi 1$ potential and consequently the phase $\varphi 2$ potential applied to the control grid of tube MR will cause such tube to fire and to cause the operation of the RV and RV1 relays. At this time the phase $\varphi 2$ potential will, due to the full wave rectification afforded by tube VT3, cause tube MI to respond and to transmit power impulses of current through the rotor circuit of motor M. With relay RV1 now operated, current from the +130 volt source of direct current is now applied to the stator circuit of the motor M in such a direction that in response to the power impulses motor M now turns the shaft 205 in a direction representative of a reduction in manifold pressure until the phase $\varphi 2$ balancing potential applied from the slider of potentiometer MP1 balances the new value of phase $\varphi 1$ potential. Then the motor will receive no further power impulses and will stop and relays RV and RV1 will release. The synchro-transmitter ST and synchro-receiver SR will now have operated to reset the manifold pressure indicator 100 to show a reduction of manifold pressure to about 22.5 inches of mercury representative of the reduction of manifold pressure incident to the operation of an engine at an idling speed of 500 R. P. M. on a closed throttle.

At the same time, with the EST1 relay 213 operated, the phase $\varphi 1$ potential derived at the slider of potentiometer RPM8 is applied over the upper front contact of relay 213 and through summing resistor 253 to the signal input conductor 250 of the manifold pressure regulator motor unit but without effect since the shaft of such unit has previously been rotated to the position in which the L2 limit switch of such unit operated.

It will now be assumed that the pilot simulates the releasing of the brake and operates the throttle lever 110 to open the engine throttle for warming up the engine and for taxiing. This movement of the throttle lever will not be sufficient to cause cam 113 to permit the associated contact set 116 to close and therefore the MPR relay 123 will remain unoperated. Cam 112, however, may permit the associated contact set 115 to close, but this will be of no effect if the Sylphon disable key 102 at the instructor's desk has not been operated, as it will be assumed.

The operation of throttle lever 110 will cause the movement of the sliders of the throttle potentiometers away from the No. 1 terminals of their windings. The movement of the slider of potentiometer T3 will be without effect, however, since the WI relay 130 is assumed to be unoperated at this time. The movement of the slider of potentiometer T1, however, is effective to decrease the phase $\varphi 2$ potential applied over the circuit through the winding of the R. P. M. potentiometer RPM9 extending from the slider of throttle potentiometer T1, back contact of the MPR relay 126, conductor 127, and through resistor 226 to ground and in parallel through resistor 227 and the winding of potentiometer RPM9 to ground. The winding of the throttle potentiometer T1 is energized in a circuit from the phase $\varphi 2$ bus bar through resistor 124, the potentiometer winding and resistor 125 to ground. With the engine now assumed to be running at an idling speed, a potential of phase $\varphi 2$ is now derived at the slider of potentiometer RPM9 and applied through summing resistor 228 to the signal input conductor 200 of the manifold pressure motor unit. This application of phase $\varphi 2$ potential balances out a part of the phase $\varphi 1$ potential applied to conductor 200 from the slider of potentiometer RPM8 and as a consequence the motor M is again controlled to turn shaft 205 in a direction representative of a decrease in manifold pressure until the slider of potentiometer MP1 readjusts the value of the phase $\varphi 2$ potential until it balances the phase $\varphi 1$ potential. The manifold pressure indicator 100 will now indicate a manifold pressure of about 21 inches of mercury. The engine speed will now increase to about 1000 R. P. M.

At the same time the movement of the slider of throttle potentiometer T2 is effective to apply a phase $\varphi 2$ potential through summing resistor 252 to the signal input conductor 250 of the manifold pressure regulator motor unit. To derive this potential, with the SHR relay 129 unoperated, a potential divider is established from the 40$\varphi 2$ bus bar, through resistor 132 and over the upper back contact of relay 129 to ground through resistor 133, from the junction point between which resistors 132 and 133 a circuit is established over the inner lower back contact of the SYF relay 128, through the winding of potentiometer T2, over the lower back contact of relay 129 and to ground at the lower back contact of relay 128. The slider of potentiometer T2 at this time establishes a shunt of the upper portion of the potentiometer winding extending through the 1300 ohm resistor 134 and over the inner upper back contact of relay 129. The phase φ2 potential derived at the slider of potentiometer T2 is now applied over the upper back contact of relay 130 and conductor 131 through summing resistor 252 to the signal input conductor 250 of the manifold pressure regulator motor unit. This phase φ2 potential when added to the phase φ2 potential applied through summing resistor 251 will still be insufficient to balance the phase φ1 potential applied through resistor 253 with the result that the motor of the manifold pressure regulator motor unit will hold the shaft of such unit with the slider of potentiometer MPR7 at the No. 3 terminal of the potentiometer winding.

It will now be assumed that the pilot operates the throttle lever 110 slowly towards its open position to produce power for take-off. When the throttle shaft 111 has rotated through 22 degrees the cam 113 will permit the contact set 116 to operate to its closed position and, with the key 103 at the instructor's desk in its normal position, a circuit is established from ground over contacts of such key, over contacts of contact set 116 and through the winding of the MPR relay 126 to battery and ground.

Relay 126 thereupon operates and disconnects the slider of the T1 throttle potentiometer from the previously traced circuit over conductor 127 and through resistor 226 to ground from which phase φ2 potential was derived by the potentiometer RPM9 and applied through resistors 251 and 228 to the signal input conductors 250 and 200 of the manifold pressure regulator and manifold pressure motor units respectively, and establishes a circuit from the slider of manifold pressure regulator potentiometer MPR7, over conductor 135, over the front contact of relay 126, conductor 127 and through resistor 226 to ground so that now the potential derived at the slider of potentiometer RPM9 and applied to signal input conductors 250 and 200 is controlled by the manifold pressure regulator potentiometer MPR7 rather than by the throttle potentiometer T1.

At the time throttle lever 110 has moved through 22 degrees of its 90-degree movement, the slider of the throttle potentiometer T2 which is capable of 300-degree movement will have moved through 70.33 degrees and the phase φ2 potential derived at such slider will have a value equal to the phase φ2 potential derived at the slider of the MPR7 potentiometer which at this time is at the No. 3 terminal of such potentiometer winding so that there will be little or no change in the φ2 potential applied through resistors 251 and 228 to signal input conductors 250 and 200 and no change in the indicated manifold pressure. To derive the phase φ2 potential at the slider of potentiometer MPR7, which will match the potential derived at the slider of the throttle potentiometer T1 at 22 degrees of throttle opening, phase φ2 potential is applied from the 40φ2 bus bar, over conductor 136, through resistor 240 and through the potentiometer winding to ground.

As the throttle lever 110 is slowly moved toward its open position for take-off, a phase φ2 potential of increasing value is derived at the slider of the throttle potentiometer T2 which is applied over the back contact of the WI relay 130, over conductor 131 and through the summing resistor 252 of the manifold pressure regulator motor unit. The value of this potential at any time is representative of the value of the manifold pressure at which the pilot desires to operate the engine for any particular manoeuvre. For take-off the lever 110 will be moved until the manifold pressure indicator shows a manifold pressure of 54.5 inches of mercury. The phase φ2 potential thus derived is added to the phase φ2 potential derived at the slider of the manifold pressure regulator potentiometer MPR7, modified by the R. P. M. potentiometer RPM9 and applied through summing resistor 251 to signal input conductor 250 and, being now greater than the phase φ1 potential applied to conductor 250 through summing resistor 253, which potential varies with the indicated air speed, with the altitude and with the engine speed, the motor of the manifold pressure regulator motor unit will rotate the slider of potentiometer MPR7 toward the No. 1 terminal of its winding to reduce the phase φ2 potential derived at such slider to maintain the summation of the phase φ2 potentials applied to conductor 250 balanced with the phase φ1 potential applied to conductor 250.

The reduction in phase φ2 potential derived at the slider of the manifold pressure regulator potentiometer MPR7 and modified by the potentiometer RPM9 in accordance with the engine speed, is also applied through summing resistor 228 to signal input conductor 200 of the manifold pressure motor unit and when added to the phase φ2 potential derived at the slider of the balancing potentiometer MP1 and applied to conductor 200 through summing resistor 233, will be reduced as the slider of potentiometer MPR7 is moved toward the No. 1 terminal of its winding with the result that the phase φ1 potential applied to conductor 200 from the slider of potentiometer RPM8 will become greater than the summation of phase φ2 potentials and the motor M' will turn shaft 205 in a direction representative of an increase in manifold pressure. The rotation of shaft 205 through the operation of the synchro-transmitter ST and synchro-receiver SR will cause the reading of the manifold pressure indicator 100 to increase. As the manifold pressure increases, the engine speed will increase and in the manner described in the applications hereinbefore referred to, the sliders of the R. P. M. potentiometers RPM8 and RPM9 will move toward the No. 3 terminals of their windings and, as air speed is developed, the slider of the indicated air speed potentiometer IAS7 will also move towards the No. 3 terminal of its winding. The result of the movement of the sliders of the potentiometers RPM8 and IAS7 is to increase the phase φ1 potential applied to the signal input conductors 200 and 250 of the manifold pressure and manifold pressure regulator motor units as the manifold pressure increases.

The movement of the slider of the RPM9 potentiometer also increases the phase φ2 potential derived at the slider of the MPR7 potentiometer and applied from the slider of potentiometer RPM9 through resistor 251 to the signal input conductor 250 as a measure of the loss in the intake manifold system, which loss increases as the engine speed increases and causes a reduction in the manifold pressure. The phase φ2 potential derived at the slider of potentiometer MPR7 must thus compensate not only for the tendency of the manifold pressure to decrease due to the manifold pressure intake loss represented by the movement of the slider of potentiometer RPM9, but must also compensate for the tendency of the manifold pressure to increase due to the increase in engine speed as represented by the movement of the slider of potentiometer RPM8 to increase the phase $\varphi1$ potential.

The phase $\varphi2$ potential derived at the slider of potentiometer MPR7 and applied through resistor 251 is added to the phase $\varphi2$ potential derived at the slider of the throttle potentiometer T2, and if the new value of phase $\varphi1$ potential applied through resistor 253 is higher than the summation of phase $\varphi2$ potentials, the motor of the manifold pressure regulator motor unit will move the slider of potentiometer MPR7 towards the No. 3 terminal of its winding to increase the phase $\varphi2$ potential derived thereat until it balances the phase $\varphi1$ potential. This increase in phase $\varphi2$ potential derived at the slider of potentiometer MPR7 being also applied through resistor 228 to signal input conductor 200 of the manifold pressure motor unit, the increased $\varphi1$ potential applied through resistor 225 becomes balanced and the manifold pressure indicator 100 will therefore show no increase in reading as a result of the increase in engine speed and air speed.

When the throttle lever has been moved through 75 degrees of its opening movement, the slider of the throttle potentiometer T2 will have moved through 83.5 per cent of its movement. At that time the slider of the manifold pressure regulator potentiometer MPR7 will have been returned toward the No. 1 terminal of its winding to reduce the phase $\varphi2$ potential applied through resistor 252 which with the phase $\varphi2$ potential derived at the throttle potentiometer T2 will balance the phase $\varphi1$ potential applied to control conductor 250. And the ground potential now applied from the slider of potentiometer MPR7 will have caused the manifold pressure motor unit to set the manifold pressure indicator 100 to show the desired reading of 54.5 inches of mercury. When the critical altitude has been reached, the slider of potentiometer MPR7 will have been returned to the No. 1 terminal of its winding representative of the full open carburetor throttle control and the further opening of the throttle lever 110 by the pilot is rendered of no avail by providing a short circuit of the last 16.5 per cent of the winding of throttle potentiometer T2 so that any further movement of the throttle through the last fifteen degrees of its opening does not further increase the phase $\varphi2$ potential derived by the potentiometer T2.

When take-off has been simulated, the pilot will close the throttle slowly until a manifold pressure of about 40 inches of mercury is indicated. The closing of the throttle will reduce the phase $\varphi2$ potential derived at the slider of the throttle potentiometer T2 and as a consequence the balance between the phase $\varphi2$ potentials and the phase $\varphi1$ potential applied to the signal input conductor 250 of the manifold pressure regulator motor unit will no longer exist and the phase $\varphi1$ potential now predominating, the motor of such unit will move the slider of potentiometer MPR7 toward the No. 3 terminal of its winding thereby increasing the phase $\varphi2$ potential derived thereat and applied through resistor 251 to conductor 250 until the summation of the phase $\varphi2$ potentials again balances the phase $\varphi1$ potential.

The increase in phase $\varphi2$ potential resulting from the movement of the slider of potentiometer MPR7 being also applied through resistor 228 to the signal input conductor 200 of the manifold pressure motor unit, the motor M of such unit is now controlled by the predominance of the phase $\varphi2$ potential to move the slider of balancing potentiometer MP1 towards the No. 1 terminal of its winding to reduce the phase $\varphi2$ potential derived therefrom and applied through resistor 233 to conductor 200 until the summation of the phase $\varphi2$ potentials again balances the phase $\varphi1$ potential derived in accordance with the new engine speed, as determined by the propeller governor, with the air speed and with the increasing altitude due to the simulated climb and applied through resistor 225 to conductor 200. Under the control of the manifold pressure motor unit, the manifold pressure indicator 100 is reset to show a manifold pressure of 40 inches of mercury.

As the altitude of the simulated flight increases the slider of the altimeter potentiometer A16 will move slowly towards the No. 3 terminal of its winding, thereby reducing the phase $\varphi1$ potential applied to the signal input conductors 200 and 250 of the manifold pressure and manifold pressure regulator motor units. Also upon the reduction of engine speed due to resetting of the propeller governor from the take-off to the climbing value of about 2600 R. P. M., the movement of the slider of the R. P. M. potentiometer RPM8 toward the No. 1 terminal of its winding, will also reduce the value of the phase $\varphi1$ potential. In addition since a climbing manoeuvre is being simulated the indicated speed will be reduced whereby the movement of the slider of the indicated air speed potentiometer IAS7 toward the No. 1 terminal of its winding will also cause a reduction in the phase $\varphi1$ potential. With this reduction in phase $\varphi1$ potential, and with the phase $\varphi2$ potential applied to conductor 250 under control of the throttle potentiometer T2, at a value determined by the pilot for a manifold pressure of 40 inches of mercury, the motor of the manifold pressure regulator motor unit will now be operated in a direction to gradually move the slider of potentiometer MPR7 towards the No. 1 terminal of its winding so that the potential of phase $\varphi2$ derived therefrom will be gradually reduced to maintain a potential balance with the phase $\varphi1$ potential on control conductor 250.

This gradually decreasing phase $\varphi2$ potential being applied to signal input conductor 200 of the manifold pressure motor unit is effective to maintain a potential balance with the phase $\varphi1$ potential applied to conductor 200 so that the manifold pressure motor will effectively maintain the manifold pressure reading at 40 inches of mercury as desired by the pilot and represented by the setting of the throttle potentiometer T2 by the throttle lever 110. Thus regardless of the change in altitude, the manifold pressure regulator motor unit will cause the manifold pressure indicator 100 to show a substantially steady manifold pressure reading. This condition will continue until the simulated flight reaches a critical altitude at which time the slider of the potentiometer MPR7 will have reached the No. 1 terminal of its winding whereafter no further balance of the phase $\varphi1$ potential is effective. If the altitude of the flight continues, as the phase $\varphi1$ potential is further reduced by the altimeter potentiometer A16, the phase $\varphi1$ potential applied to conductor 200 of the manifold pressure motor unit will become less than the summation of the phase $\varphi2$ potentials applied under the control of the balancing potentiometer MP1 and under the control of the manifold pressure regulator potentiometer MPR7 and the motor M of the manifold pressure motor unit will therefore be operated in a direction to cause the indicator 100 to show a reduction in manifold pressure.

When this situation occurs the pilot, noting a reduction of manifold pressure or when he anticipates that the regulator will not maintain the manifold pressure at the desired value, will shift the supercharger blower to high blower speed by the operation of the supercharger control 120 to its "high" position thereby extinguishing the "low" speed lamp 106 at the instructor's desk and closing a circuit from ground over its "high" contact set and over the upper back contact of the SYF relay 128 through the winding of the SHR relay 129 to battery. Relay 129 upon operating extends its operating ground over its lower front contact and over conductor 137 through the winding of the SHR1 relay 241 of the R. P. M. motor unit which in turn causes the operation of the SHR relay 235. Relay 241 also closes a circuit from ground over its inner contacts and conductor 138 through the "high" blower lamp 107 at the instructor's desk to inform the instructor that the pilot has shifted the supercharger blower into high speed. The operation of the SHR relay 235 establishes a new lower resistance circuit over which phase $\varphi 1$ potential is applied from the slider of the altimeter potentiometer A16 through the winding of the R. P. M. potentiometer RPM8. This circuit extends as previously traced from such slider to the back contact of the ALT relay 219, thence over the upper front contact of relay 235, through the winding of potentiometer RPM8 and over the lower front contact of relay 235 through resistor 238 to ground. Also relay 235 establishes a new shunt of the lower half of the winding of potentiometer RPM8 over the inner upper front contact of relay 235 and through resistor 242, which shunt is of slightly less resistance than the shunt which existed prior to the energization of relay 235. Also the 6800 ohm resistance shunt through resistor 243 of the winding of potentiometer RPM8 is removed at the middle upper back contact of relay 235. The total result of the change in the resistance network associated with potentiometer RPM8 incident to the operation of relay 235 is to cause a higher potential of phase $\varphi 1$, which increases at a faster rate as the engine speed increases, to be derived at the slider of potentiometer RPM8.

The operation of the SHR relay 129 establishes a new circuit over which phase $\varphi 2$ potential is applied from ground through resistor 139, over the inner lower front contact of relay 129, through the winding of potentiometer T2, over the inner lower back contact of relay 128 to the junction point between resistors 133 and 140 of the potential divider connected from ground through resistor 133 and over the upper front contact of relay 129 through resistor 140 to the 40$\varphi 2$ bus bar. With relay 129 operated, the upper half of the winding of potentiometer T2 is shunted through the 1150 ohm resistor 141 and over the inner upper front contact of relay 129 and the former resistance shunt from the No. 3 terminal of the potentiometer winding over the inner upper back contact of relay 129 and through resistor 134 is opened. The result of the change in the resistance network associated with the potentiometer T2 is to cause a lower potential of phase $\varphi 2$, which increases at a lower rate as the throttle is opened, to be derived at the slider of such potentiometer.

When, therefore, the blower speed is changed, there will be an abrupt increase in phase $\varphi 1$ potential applied to the signal input conductors 200 and 250 of the manifold pressure and manifold pressure regulator motor units and at the same time an abrupt decrease in the phase $\varphi 2$ potential derived at the slider of the throttle potentiometer T2 and applied to the signal input conductor 250 of the manifold pressure regulator motor unit. Therefore, the summation of the phase $\varphi 2$ potentials applied to signal input conductor 250 from the slider of potentiometer T2 and from the slider of the manifold regulator potentiometer MPR7 will no longer balance the increased value of phase $\varphi 1$ potential and the motor of the manifold pressure regulator motor unit will therefore in response to the predominant phase $\varphi 1$ potential move the slider of potentiometer MPR7 toward the No. 3 terminal of its winding to increase the phase $\varphi 2$ potential derived thereat until a potential balance on conductor 250 is again secured.

The increase in phase $\varphi 2$ potential now derived at the slider of potentiometer MPR7 and applied to signal input conductor 200 now tends to offset the increase in phase $\varphi 1$ potential due to the high blower manifold pressure schedule to maintain the indicated manifold pressure at the desired value of 40 inches of mercury. If the climbing manoeuvre is continued, the further increase in altitude as represented by the movement of the slider of the altimeter potentiometer A16 continues to decrease the phase $\varphi 1$ potential applied to signal input conductor 250 and, to maintain a potential balance on conductor 250, the manifold pressure regulator motor unit causes the movement of the slider of potentiometer MPR7 toward the No. 1 terminal of its winding thereby reducing the phase $\varphi 2$ potential derived at such slider and applied to signal input conductor 200 to counterbalance reduction in phase $\varphi 1$ potential applied to conductor 200. As a result the manifold pressure motor unit maintains the indicated manifold pressure at 40 degrees of mercury until the slider of potentiometer MPR7 again reaches its No. 1 terminal representative of the critical altitude for the high blower manifold pressure schedule.

From this point the manifold pressure regulator motor unit is ineffective to maintain the indicated manifold pressure at 40 degrees of mercury since as the altitude further increases and the phase $\varphi 1$ potential decreases it is no longer possible for the manifold pressure regulator potentiometer MPR7 to further decrease the phase $\varphi 2$ potential. Consequently, as the phase $\varphi 1$ potential applied to signal input conductor 200 of the manifold pressure motor unit decreases, the motor of such unit will be operated in a direction representative of a decrease in manifold pressure which will be indicated by the indicator 100.

The climbing manoeuvre may continue until the ceiling altitude has been reached, but the manifold pressure will continue to decrease with a consequent reduction in engine power and a slower rate of climb.

When at any time during the climbing manoeuvre, the pilot desires to level off the flight for crusing, he will manipulate the flight controls to cause the flight to level off and will gradually close the throttle lever 110 until a manifold pressure of about 24 inches of mercury is indicated and the engine speed will be determined by the propeller governor at about 1800 revolutions per minute. It will be assumed that at the time the flight is thus leveled off, the supercharger blower is at high speed and that relays 129, 135 and 241 are all operated. With the closure of the throttle lever 110, the slider of throttle potentiometer T2 will be moved toward the No. 1 terminal of its winding thereby reducing the phase $\varphi 2$ potential derived thereat and applied to the signal input conductor 250 of the manifold pressure regulator motor unit. The summation of the phase $\varphi 2$ potentials now applied to conductor 250 will be less than the phase $\varphi 1$ potential applied to conductor 250 and to conductor 200 of the manifold pressure motor unit and consequently the motor unit will move the slider of the potentiometer MPR7 toward the No. 3 terminal of its winding to increase the phase $\varphi 2$ potential derived thereat and applied to conductors 200 and 250 until a potential balance on conductor 250 is again attained.

With this potential balance secured the phase $\varphi 2$ potential derived at the slider of poentiometer MPR7 and applied to signal input conductor 200 is effective to cause the motor M of the manifold pressure motor unit to turn the shaft 205 of that unit in a direction representative of a decrease in manifold pressure until the phase $\varphi 2$ potential derived at the slider of balancing potentiometer MP1 when summed with the phase $\varphi 2$ potential applied from the slider of potentiometer MPR7 balances the phase $\varphi 1$ potential. When the manifold pressure as indicated by the indicator 100 has been reduced to the desired value of 24 inches of mercury, the pilot will cease closing the throttle. Thereafter the manifold pressure regulator motor unit will function as previously described to maintain the indicated manifold pressure at 24 inches of mercury. If the simulated flight is at the critical altitude, the carburetor throttle is wide open and the slider of potentiometer MPR7 is at terminal 1. To illustrate water injection, it should be employed at lower simulated altitude so that the water injection can cause an increase in manifold pressure as described in the following paragraphs.

Should the pilot require military power at this time he may secure such power by opening the throttle whereupon the manifold pressure will be increased as previously described in connection with the takeoff manoeuvre until when the manifold pressure of about 40 inches of mercury is secured the slider of the manifold pressure regulator potentiometer MPR7 will have been returned to the No. 1 terminal of its winding representative of the full open position of the carburetor throttle. At such time the throttle lever 110 will have been moved through 75 degrees of its opening movement and further movement of the throttle lever will be of no avail, since the last 16.5 per cent or 70.33 degrees of the winding of the throttle potentiometer T2 is short-circuited and no further change in the phase $\varphi 2$ potential applied therefrom to the signal input conductor 250 is possible at this time.

The pilot may, however, secure more power by using water injection. The use of water injection in an engine has the beneficial result of cooling the engine to prevent it from overheating and thus permitting the engine to be operated at a higher manifold pressure as long as the supply of the water and alcohol mixture, usually about 15 gallons, lasts. To use the water injection the pilot closes the water injection circuit breaker switch 122 thereby establishing the circuit of the WI relay 142. Relay 142 closes an obvious circuit for the "water injection on" lamp 108 at the instructor's desk and, if the "anti-detonant" key 101 at the instructor's desk has been closed representative of the availability of water, a circuit will be closed from ground over the contacts of the MB relay 143, if relay 143 has been operated to simulate the availability of power to run the water injection pressure motor, thence over the lower contacts of relay 142, over the contacts of key 101, over the upper contacts of the T relay 144, now operated from the contact set 119 closed by cam 118 with the throttle lever in a position beyond 75 degrees closure, thence over the inner upper back contact of the SYF relay 128 and through the winding of the WI relay 130 to battery and ground.

Relay 130 upon operating opens the circuit previously traced from the slider of throttle potentiometer T2 over which phase $\varphi 2$ potential was applied through the winding of potentiometer RPM9 to provide a phase $\varphi 2$ signal on the signal input conductor 250 of the manifold pressure regulator motor unit and establishes a circuit from the slider of throttle potentiometer T3 from which phase $\varphi 2$ potential becomes applied over conductor 131 and through summing resistor 252 to conductor 250. To derive this potential, phase $\varphi 2$ potential derived at the junction point between the potential divider resistors 145 and 146, is applied through the winding of potentiometer T3 to ground. The potential available at the slider of potentiometer T3, at this time when the switchover is made to "water injection" and relay 130 operates, will be considerably lower than the potential derived at the slider of potentiometer T2 prior to the switchover and therefore there will be an abrupt decrease in phase $\varphi 2$ potential applied through resistor 252 to signal input conductor 250.

The summation of the phase $\varphi 2$ potentials now applied to conductor 250 will be less than the phase $\varphi 1$ potential and consequently the motor of the manifold pressure regulator motor unit will move the slider of potentiometer MPR7 toward the No. 3 terminal of its winding until the phase $\varphi 2$ potential derived at its slider will provide a potential balance on conductor 250. This increase of phase $\varphi 2$ potential being applied to the signal input conductor 200 of the manifold pressure motor unit, will cause such unit to function in a manner representative of an increase of manifold pressure to 54.5 inches of mercury.

As the throttle lever is further moved toward its full open position the phase $\varphi 2$ potential derived at the slider of throttle potentiometer T3 will increase and as it increases the manifold pressure regulator motor unit will respond in the manner previously described to cause the potentiometer MPR7 to decrease the phase $\varphi 2$ potential derived at its slider to maintain a balance between the phase $\varphi 1$ and phase $\varphi 2$ potentials applied to conductor 250 whereby the decrease in potential applied to control conductor 200 of the manifold pressure motor unit from the slider of potentiometer MPR7 will cause the manifold pressure motor unit to control the manifold pressure indicator 100 to show an increasing manifold pressure above 54.5 inches of mercury. This will continue until the slider of potentiometer MPR7 reaches the No. 1 terminal of its winding at which time the indicator 100 will show no further increase in reading.

Simulation of failure of regulator servo system

To simulate the disabling of the servo system of the manifold pressure regulator of an airplane, the instructor may operate key 103 at his desk thereby preventing the operation of the MPR relay 126 when the pilot opens the throttle beyond the 22-degree angle at which time the manifold pressure regulator would ordinarily become operative to automatically control the carburetor throttle. With relay 126 unoperated the continued opening of the throttle lever 110 is effective through the throttle potentiometer T1 to apply a decreasing value of phase φ2 potential to the signal input control conductors 200 and 250 of the manifold pressure and manifold pressure regulator motor units as it does during the first 22 degrees of the throttle travel and, as a consequence, the manifold pressure motor unit will respond to cause the movement of the slider of balancing potentiometer MP1 in a direction representative of an increase of manifold pressure. When, however, the throttle lever 110 has been moved to its full open position and the slider of potentiometer T1 is at the No. 3 terminal of its winding, the manifold pressure motor unit will have been set to indicate a value of manifold pressure of about 48 inches of mercury and this manifold pressure will then vary with the air speed, with the altitude and with the R. P. M. since the pilot having fully opened the throttle cannot maintain the manifold pressure above the critical value of 48 inches.

Simulation of failure of Sylphon bellows of the regulator

The instructor may simulate the failure of the Sylphon bellows of the manifold pressure regulator by operating the key 102. With this key operated, when the throttle lever 110 is operated by the pilot to a position representative of any throttle opening greater than 9 degrees, cam 112 will permit the closure of the associated contact set 115 thereby establishing a circuit from ground over the contact of key 102, over the contacts of contact set 115 and through the winding of the SYF relay 128 to battery. Relay 128 upon operating establishes an obvious circuit for the MPR relay 126, opens the circuit of the WI relay 130 at its inner upper back contact to prevent the operation of relay 130, and changes the resistance network associated with the throttle potentiometer T2. The operation of relay 128 establishes a new circuit for energizing the winding of potentiometer T2 which extends from the junction point between potential divider resistors 147 and 148, over the inner lower front contact of relay 128, through the winding of potentiometer T2, over the lower back contact of the SHR relay 129, over the lower front contact of relay 128 and through resistor 149 to ground. As before, with the SHR relay 129 deenergized, representative of a low supercharger blower speed, the upper portion of the winding of the potentiometer is shunted over the inner upper back contact of relay 129, through resistor 134 and over the slider of the potentiometer. The change in the resistance network resulting from the operation of relay 128 is such that a sudden increase in the potential derived at the slider of potentiometer T2 takes place when relay 128 operates and this increase in phase φ2 potential applied to the signal input conductor 250 of the manifold pressure regulator motor unit causes such motor unit to operate in a direction to move the slider of potentiometer MPR7 back toward the No. 1 terminal of the winding to a degree representative of the absolute drain oil pressure in the manifold pressure regulator of an airplane.

When the slider of potentiometer MPR7 moves toward the No. 1 terminal, the phase φ2 potential applied therefrom to the signal input conductor 200 of the manifold pressure motor unit is reduced and thereupon the phase φ1 potential applied to conductor 209 becomes predominating. The motor M then rotates the shaft 205 in a direction representative of an increase in manifold pressure until the slider of the manifold pressure balancing potentiometer MP1 has been advanced to a position in which the phase φ2 potential applied therefrom balances the phase φ1 potential determined in accordance with the indicated air speed, altitude, and engine speed.

As the throttle is further opened the phase φ2 potential derived at the slider of potentiometer T2 will increase resulting in the operation of the manifold pressure regulator motor unit to move the slider of potentiometer MPR7 farther back toward its No. 1 terminal thereby to maintain the balance between the phase φ2 potential and the phase φ1 potential applied to signal input conductor 250. The reduction of the phase φ2 potential derived at the slider of potentiometer MPR7 being also effective at the signal input conductor 200 of the manifold pressure motor unit causes such unit to operate its balancing potential MP1 in a direction to increase the balancing potential of phase φ2 derived thereat to maintain a potential balance on conductor 200 and to cause the manifold pressure indicator 100 to show an increase in manifold pressure as the throttle opening increases.

When the throttle lever 110 is moved back toward its closed position the slider of the throttle potentiometer T2 is moved back toward the No. 1 terminal of the potentiometer winding with the result that the manifold pressure regulator motor unit controls the manifold pressure motor unit in a manner representative of a gradual decrease in the manifold pressure indication representative of the decrease in manifold pressure which would result from the gradual closing of the carburetor throttle by the regulator in response to the closing of the pilot's throttle lever. When the throttle lever 110 is moved to a point in which the angle of opening is less than 9 degrees, cam 112 permits contact set 115 to open to thereby release the SYF and MPR relays 129 and 126.

When relay 126 releases the phase φ2 potential derived at the slider of the MPR7 potentiometer is removed from the signal input conductor 200 of the manifold pressure motor unit and the phase φ2 potential derived at the slider of the throttle potentiometer T1 is applied over the previously traced circuit to conductor 200. This potential will be considerably less than the potential applied from the potentiometer MPR7 and as a consequence the manifold pressure motor unit will function in a manner representative of the rather sudden decrease in manifold pressure which would result in an actual regulator due to the "low boost lock-out" feature which enables a pilot to regain manual control of the carburetor throttle when low power is required for landing or taxiing operations.

As the throttle lever is moved farther toward its full closed position the movement of the slider of potentiometer T1 is now effective to increase the phase φ2 potential applied to conductor 200 thereby causing the manifold pressure to follow the throttle movement irrespective of the manifold pressure regulator motor unit.

The instructor may at any time cause a change in the manifold pressure indication for instruction purposes by the operation of the manifold pressure potentiometer MPP. The winding of this potentiometer is energized by phase φ2 potential applied from the 40φ2 bus bar through resistor 150 and therefore the movement of the slider of this potentiometer is effective to derive a phase φ2 potential and to apply it over conductor 151, over the upper front contact of the EST2 relay 214 and through resistor 229 to the signal input conductor 200 of the manifold pressure motor unit which will cause such motor unit to operate in a manner representative of a reduction in the indicated manifold pressure.

In the preceding description it will be recalled that the phase φ1 potential applied through resistors 225 and 253 to the signal input conductors 200 and 250 of the manifold pressure and manifold pressure regulator motor units was derived as a function of the indicated air speed at the indicated air speed potentiometer IAS7, and that this potential increases to cause an increase in manifold pressure as the air speed increases. This simulates the ram effect which in an actual airplane causes an increase in manifold pressure as the air speed increases. It will be noted that due to the short-circuiting of the lower half of the winding of potentiometer IAS7 the phase φ1 potential increases at a faster rate to cause a faster increase in manifold pressure as the air speed increases in simulation of the faster increase of manifold pressure in an actual airplane due to the ram effect as the air speed increases.

This phase φ1 potential will also be slightly decreased to cause a slightly lower manifold pressure indication if the pilot switches the operation of the engine to alternate carburetor air by causing the operation of the ALT relay 219, since in an actual airplane a loss of manifold pressure is introduced when the pilot switches the carburetor air intake to alternate air thereby introducing some frictional losses which lower the intake air pressure at the carburetor.

What is claimed is:

1. In an aircraft trainer wherein the operation of an airplane engine under the control of a manifold pressure regulator is simulated, means operable representative of the speed of an airplane engine, means operable representative of the indicated air speed of a simulated flight, means operable representative of the altitude of a simulated flight, a simulated throttle control lever, a source of current, means under the control of said throttle lever for deriving a potential of one phase from said source representative of a desired manifold pressure, means for deriving a potential of opposite phase from said source representative of the unregulated manifold pressure under the control of said engine speed simulating means, said indicated air speed simulating means and altitude simulating means, means for deriving a potential from said source of said first phase equal to the difference in said other potentials, means for summarizing said latter two potentials, and motor means responsive to said summarizing means for controlling other circuits and apparatus of the trainer to a degree representative of the desired manifold pressure.

2. In an aircraft trainer wherein the operation of an airplane engine under the control of a manifold pressure regulator is simulated, means operable representative of the speed of an airplane engine, means operable representative of the indicated air speed of a simulated flight, means operable representative of the altitude of a simulated flight, a simulated throttle control lever, a source of current, means under the control of said throttle lever for deriving a potential of one phase from said source representative of a desired manifold pressure, means for modifying said derived potential in accordance with a low or a high simulated supercharger blower schedule, means for deriving a potential of opposite phase from said source representative of the unregulated manifold pressure under the control of said engine speed simulating means, said indicated air speed simulating means and altitude simulating means, means for deriving a potential from said source of said first phase equal to the difference in said other potentials, means for summarizing said latter two potentials, and motor means responsive to said summarizing means for controlling other circuits and apparatus of the trainer to a degree representative of the desired manifold pressure.

3. In an aircraft trainer wherein the operation of an airplane engine under the control of a manifold pressure regulator is simulated, means operable representative of the speed of an airplane engine, means operable representative of the indicated air speed of a simulated flight, means operable representative of the altitude of a simulated flight, a simulated throttle control lever, a source of current, means under the control of said throttle lever for deriving a first potential of one phase from said source representative of a desired manifold pressure under which the simulated engine should be operated for low power output, means for deriving a second potential of opposite phase from said source representative of the unregulated manifold pressure under the control of said engine speed simulating means, said indicated air speed simulating means and altitude simulating means, means for summarizing said potentials, motor means responsive to said summarizing means to a degree representative of the unregulated manifold pressure at low engine power, means under control of said throttle lever after said lever has been operated beyond a predetermined open position for discontinuing the derivation of said first potential and for causing the derivation of a potential of the same phase from said source representative of a desired manifold pressure for high engine power, means for deriving a potential from said source of the same phase as said latter potential equal to the difference between said latter potential and said second potential, means for causing the summation of said latter potential and said second potential and the application of said latter summation potential to said motor means for causing said motor means to control other circuits and apparatus of the trainer to a degree representative of the desired manifold pressure.

4. In an aircraft trainer wherein the operation of an airplane engine under the control of a manifold pressure regulator is simulated, means operable representative of the speed of an airplane engine, means operable representative of the indicated air speed of a simulated flight, means operable representative of the altitude of a simulated flight, a simulated throttle control lever, a source of current, a water injection simulation control key, means under the control of said throttle lever if said key has been operated for deriving a potential of one phase from said source representative of a manifold pressure desired under a water injection schedule, means for deriving a potential of opposite phase from said source representative of the unregulated manifold pressure under the control of said engine speed simulating means, said indicated air speed simulating means and altitude simulating means, means for deriving a potential from said source of said first phase equal to the difference in said other potentials, means for summarizing said latter two potentials, and motor means responsive to said summarizing means for controlling other circuits and apparatus of the trainer to a degree representative of the manifold pressure desired under the water injection schedule.

5. In an aircraft trainer wherein the operation of an airplane engine under the control of a manifold pressure regulator is simulated, means operable representative of the speed of an airplane engine, means operable representative of the indicated air speed of a simulated flight, means operable representative of the altitude of a simulated flight, a simulated throttle control lever, an instructor's desk, a key at said desk operable to represent the availability of the water supply for water injection, a switch operable to represent the availability of power to operate a water injection pressure pump, a simulated water injection control key, a source of current, means under the control of said throttle lever if said keys and said switch have been operated for deriving a potential of one phase from said source representative of a manifold pressure desired under a water injection schedule, means for deriving a potential of opposite phase from said source representative of the unregulated manifold pressure under the control of said engine speed simulating means, said indicated air speed simulating means and altitude simulating means, means for deriving a potential from said source of said first phase equal to the difference in said other potentials, means for summarizing said latter two potentials, and motor means responsive to said summarizing means for controlling other circuits and apparatus of the trainer to a degree representative of the manifold pressure desired under the water injection schedule.

6. In an aircraft trainer wherein the operation of an airplane engine under the control of a manifold pressure regulator is simulated, means operable representative of the speed of an airplane engine, means operable representative of the indicated air speed of a simulated flight, means operable representative of the altitude of a simulated flight, a simulated throttle control lever, a source of current, a water injection simulation key, means under the control of said throttle lever if said key has been operated and said throttle has been opened through a predetermined angle for deriving a potential of one phase from said source representative of a manifold pressure desired under a water injection schedule, means for deriving a potential of opposite phase from said source representative of the unregulated manifold pressure under the control of said engine speed simulating means, said indicated air speed simulating means and altitude simulating means, means for deriving a potential from said source to said first phase equal to the difference in said other potentials, means for summarizing said latter two potentials, and motor means responsive to said summarizing means for controlling other circuits and apparatus of the trainer to a degree representative of the manifold pressure desired under the water injection schedule.

7. In an aircraft trainer wherein the operation of an airplane engine under the control of a manifold pressure regulator is simulated, means operable representative of the speed of an airplane engine, means operable representative of the indicated air speed of a simulated flight, means operable representative of the altitude of a simulated flight, a simulated throttle control lever, a source of current, means under the control of said throttle lever for deriving a potential of one phase from said source representative of a desired manifold pressure, means for deriving a potential of opposite phase from said source representative of the unregulated manifold pressure under the control of said engine speed simulating means, said indicated air speed simulating means and altitude simulating means, means for deriving a potential from said source of said first phase equal to the difference in said other potentials, means for summarizing said latter two potentials, motor means responsive to said summarizing means for controlling other circuits and apparatus of the trainer to a degree representative of the desired manifold pressure, means for deriving a potential of said first phase from said source under the control of said throttle lever, and a key for simulating the failure of the servomechanism of the manifold pressure regulator effective to discontinue the derivation of said first potential and to render the summation of said latter and said second potentials effective to control said motor means to a degree representative of the unregulated manifold pressure determined by the setting of said throttle lever.

8. In an aircraft trainer wherein the operation of an airplane engine under the control of a manifold pressure regulator is simulated, means operable representative of the speed of an airplane engine, means operable representative of the indicated air speed of a simulated flight, means operable representative of the altitude of a simulated flight, a simulated throttle control lever, a source of current, means under the control of said throttle lever for deriving a first potential of one phase from said source representative of a desired manifold pressure, means for deriving a potential of opposite phase from said source representative of the unregulated manifold pressure under the control of said engine speed simulating means, said indicated air speed simulating means and altitude simulating means, means for summarizing said derived potentials, a first motor driven means responsive to said summarizing means for deriving a potential from said source of said first phase equal to the difference in said other potentials, means for summarizing said latter two potentials, a second motor means responsive to said latter summarizing means for controlling other circuits and apparatus of the trainer to a degree representative of the desired manifold pressure, a key for simulating the failure of the Sylphon bellows of a manifold pressure regulator, and means controlled by said key for altering said first potential deriving means to increase said first potential to a degree representative of the pressure leakage of the disabled bellows whereby said latter motor driven means is controlled on a different schedule for controlling other circuits and apparatus in the trainer to a degree representative of the desired manifold pressure.

9. In an aircraft trainer wherein the operation of an airplane engine under the control of a manifold pressure regulator is simulated, means operable representative of the speed of an airplane engine, means operable representative of the indicated air speed of a simulated flight, means operable representative of the altitude of a simulated flight, a simulated throttle control lever, a source of current, means under the control of said throttle lever for deriving a first potential of one phase from said source representative of a desired manifold pressure, means for deriving a potential of opposite phase from said source representative of the unregulated manifold pressure under the control of said engine speed simulating means, said indicated air speed simulating means and altitude simulating means, means for summarizing said derived potentials, a first motor driven means responsive to said summarizing means for deriving a potential from said source of said first phase equal to the difference in said other potentials, means for summarizing two potentials, a second motor means responsive to said latter summarizing means for controlling other circuits and apparatus of the trainer to a degree representative of the desired manifold pressure for high engine power, a key for simulating the failure of the Sylphon bellows of a manifold pressure regulator, means controlled by said key for altering said first potential deriving means to increase said first potential to a degree representative of the pressure leakage of the disabled bellows whereby said responsive latter motor driven means is controlled on a different schedule for controlling other circuits and apparatus of the trainer to a degree representative of the desired manifold pressure, means for deriving a potential of said first phase from said source under the control of said throttle lever, and means controlled by said throttle lever when it is moved to a predetermined position in its closing movement to disable said key controlled means, discontinue the derivation of said first potential and to render the summation of said latter and second potentials effective to control said second motor driven means for controlling other circuits and apparatus of the trainer to a degree representative of the unregulated manifold pressure determined by the setting of said throttle lever for low engine power.

10. In an aircraft trainer wherein the operation of an airplane engine under the control of a manifold pressure regulator is simulated, means operable representative of the speed of an airplane engine, means operable representative of the indicated air speed of a simulated flight, means operable representative of the altitude of a simulated flight, a simulated throttle control lever, a source of current, a control conductor, means under the control of said throttle lever for deriving a potential of one phase from said source and for applying it to said conductor, means for deriving a potential of opposite phase from said source representative of the unregulated manifold pressure under the control of said engine speed simulating means, said indicated air speed simulating means and altitude simulating means, and for applying it to said conductor, a potentiometer for deriving a potential from said source of said first phase equal to the difference in said other potentials and for applying it to said conductor, a motor responsive to an unbalanced potential condition on said conductor for adjusting said potentiometer until the sum of the potentials applied to said conductor becomes zero, means for summarizing said latter two potentials, and motor means responsive to said summarizing means for controlling other circuits and apparatus of the trainer to a degree representative of the desired manifold pressure.

11. In an aircraft trainer wherein the operation of an airplane engine under the control of a manifold pressure regulator is simulated, means operable representative of the speed of an airplane engine, means operable representative of the indicated air speed of a simulated flight, means operable representative of the altitude of a simulated flight, a simulated throttle control lever, a source of current, a control conductor, means under the control of said throttle lever for deriving a potential of one phase from said source and for applying it to said conductor, means for deriving a potential of opposite phase from said source representative of the unregulated manifold pressure under the control of said engine speed simulating means, said indicated air speed simulating means and altitude simulating means, and for applying it to said conductor, a potentiometer for deriving a potential from said source of said first phase equal to the difference in said other potentials and for applying it to said conductor, a motor responsive to an unbalanced potential condition on said conductor for adjusting said potentiometer until the sum of the potentials applied to said conductor becomes zero, a second control conductor to which said latter two potentials are applied, a balancing potentiometer for deriving a potential of said first phase from said source and for applying it to said latter conductor, a second motor operable in response to the unbalanced potential condition on said latter conductor for adjusting said balancing potentiometer until the sum of the potentials applied to said conductor becomes zero, and a simulated manifold pressure indicator controlled by said latter motor to indicate the desired regulated manifold pressure.

12. In an aircraft trainer wherein the operation of an airplane engine is simulated, means operable representative of the speed of an airplane engine, means operable representative of the indicated air speed of a simulated flight, means operable representative of the altitude of a simulated flight, a source of current, means for deriving a potential from said source under the control of said indicated air speed and said altitude simulating means which varies in accordance with the indicated air speed and altitude of the simulated flight in simulation of the ram effect on the manifold pressure produced in the flight of an airplane, means controlled by said engine speed simulating means for modifying said latter potential in accordance with the simulated engine speed, and motor means responsive to said modified potential for controlling other circuits and apparatus of the trainer to a degree representative of the manifold pressure.

13. In an aircraft trainer wherein the operation of an airplane engine is simulated, means operable representative of the speed of an airplane engine, means operable representative of the indicated air speed of a simulated flight, means operable representative of the altitude of a simulated flight, a simulated throttle control lever, a control conductor, a source of current, means responsive to said throttle lever for deriving a first potential from said source and for applying it to said conductor which varies with the throttle opening, means for deriving a second potential of opposite phase from said source and for applying it to said conductor under the control of said indicated air speed and said altitude simulating means which varies in accordance with the indicated air speed and altitude of the simulated flight in simulation of the ram effect on the manifold pressure produced in the flight of an airplane, means controlled by said engine speed simulating means for modifying said latter potential in accordance with the simulated engine speed, a balancing potentiometer for deriving a potential of the same phase as said first potential from said source and for applying it to said conductor, a motor responsive to an unbalanced potential condition on said conductor to adjust said potentiometer until the sum of the potentials applied to said conductor becomes zero, and a simulated manifold pressure indicator operable by said motor.

14. In an aircraft trainer wherein the operation of an airplane engine is simulated, means operable representative of the speed of an airplane engine, means operable representative of the indicated air speed of a simulated flight, means operable representative of the altitude of a simulated flight, a source of current, means controlled by said indicated air speed simulating means for deriving a potential from said source which increases at an increasing rate as the air speed of a simulated flight increases, means controlled by said altitude simulating means for modifying said potential in accordance with the altitude of the simulated flight whereby said modified potential varies in simulation of the ram effect on the manifold pressure produced in the flight of an airplane, means controlled by said engine speed simulating means for further modifying said potential in accordance with the simulated engine speed, and motor means responsive to said latter potential for controlling other circuits and apparatus of the trainer to a degree representative of the manifold pressure.

JOSEPH J. LUKACS.

REFERENCES CITED

The following references are of record in the file of this patent:

UNITED STATES PATENTS

| Number | Name | Date |
|---|---|---|
| 2,099,857 | Link | Nov. 23, 1937 |
| 2,332,523 | Norden | Oct. 26, 1943 |
| 2,346,838 | Haight | Apr. 18, 1944 |
| 2,366,603 | Dehmel | Jan. 2, 1945 |
| 2,372,741 | Roberts | Apr. 3, 1945 |
| 2,395,477 | Gumley | Feb. 26, 1946 |
| 2,406,836 | Holden | Sept. 3, 1946 |
| 2,408,081 | Lovell | Sept. 24, 1946 |
| 2,428,767 | Albert | Oct. 14, 1947 |
| 2,439,168 | Kail | Apr. 6, 1948 |